(12) United States Patent
Marlow et al.

(10) Patent No.: US 8,924,706 B2
(45) Date of Patent: Dec. 30, 2014

(54) SYSTEMS AND METHODS USING ONE TIME PADS DURING THE EXCHANGE OF CRYPTOGRAPHIC MATERIAL

(71) Applicant: Protected Mobility, LLC, Rockville, MD (US)

(72) Inventors: William J. Marlow, Herndon, VA (US); Robert Cichielo, Asbury, NJ (US); Emil Sturniolo, Medina, OH (US); Paul Benware, Mendon, NY (US)

(73) Assignee: Protected Mobility, LLC, Rockville, MD (US)

( * ) Notice: Subject to any disclaimer, the term of this patent is extended or adjusted under 35 U.S.C. 154(b) by 0 days.

(21) Appl. No.: 13/670,994

(22) Filed: Nov. 7, 2012

(65) Prior Publication Data

US 2013/0283034 A1    Oct. 24, 2013

Related U.S. Application Data

(60) Provisional application No. 61/556,652, filed on Nov. 7, 2011.

(51) Int. Cl.
| | | |
|---|---|---|
| *H04L 29/06* | (2006.01) | |
| *G06F 21/60* | (2013.01) | |
| *H04L 9/00* | (2006.01) | |
| *H04L 9/08* | (2006.01) | |
| *H04L 9/32* | (2006.01) | |

(52) U.S. Cl.
CPC ............... *G06F 21/602* (2013.01); *H04L 9/00* (2013.01); *H04L 63/0869* (2013.01); *H04L 63/0853* (2013.01); *H04L 9/0816* (2013.01); *H04L 9/32* (2013.01); *H04L 9/0861* (2013.01); *H04L 63/0823* (2013.01); *H04L 9/0863* (2013.01); *H04L 9/3228* (2013.01); *H04L 63/061* (2013.01); *H04L 63/18* (2013.01)

USPC ........................................................ 713/150

(58) Field of Classification Search
CPC ....... H04L 9/00; H04L 9/0816; H04L 9/0861; H04L 9/32; H04L 63/0823; H04L 63/0853; H04L 63/0869; H04L 9/0863; H04L 9/3228; H04L 63/061; H04L 63/18
See application file for complete search history.

(56) References Cited

U.S. PATENT DOCUMENTS

| 5,592,555 A | 1/1997 | Stewart |
|---|---|---|
| 6,125,281 A | 9/2000 | Wells et al. |

(Continued)

FOREIGN PATENT DOCUMENTS

WO        WO 0195558        12/2001

OTHER PUBLICATIONS

Nov. 15, 2013 & Apr. 30, 2014 Office Actions in U.S. Appl. No. 13/670,925.

(Continued)

*Primary Examiner* — Krisna Lim
(74) *Attorney, Agent, or Firm* — Nixon & Vanderhye P.C.

(57) ABSTRACT

A solution that enables the exchange of information in a secure manner over an insecure text messaging infrastructure provides part of the exchange as cryptographic material to be used to secure subsequent communications. The exchange of the cryptographic material is protected from malicious and nefarious parties. Systems and methods for the exchange of cryptographic material enable the parties involved in the exchange to have confidence that the material received was communicated from the originating party. Once the cryptographic material is successfully exchanged between cooperating peers, it can be used by smartphones, tablets, feature phones, or special purpose machine to machine devices for private communications, such as command and control, location services, etc. over insecure voice or data communication paths, such as SMS.

2 Claims, 15 Drawing Sheets

(56) References Cited

U.S. PATENT DOCUMENTS

| | | | |
|---|---|---|---|
| 6,356,937 | B1 | 3/2002 | Montville et al. |
| 7,076,657 | B2 | 7/2006 | Koukoulidis et al. |
| 7,424,615 | B1* | 9/2008 | Jalbert et al. ............... 713/171 |
| 7,702,898 | B2 | 4/2010 | Tan |
| 8,064,606 | B2 | 11/2011 | Schuba et al. |
| 8,386,800 | B2 | 2/2013 | Kocher et al. |
| 8,464,061 | B2* | 6/2013 | Bradley ....................... 713/171 |
| 2002/0123967 | A1 | 9/2002 | Wang |
| 2004/0171369 | A1 | 9/2004 | Little et al. |
| 2005/0232422 | A1 | 10/2005 | Lin et al. |
| 2006/0158460 | A1 | 7/2006 | Uh |
| 2006/0246956 | A1 | 11/2006 | Park et al. |
| 2007/0022295 | A1 | 1/2007 | Little et al. |
| 2007/0072564 | A1 | 3/2007 | Adams |
| 2007/0083766 | A1* | 4/2007 | Farnham et al. ............. 713/176 |
| 2007/0185815 | A1 | 8/2007 | Boccon-Gibod et al. |
| 2008/0313458 | A1* | 12/2008 | Fascenda et al. ............ 713/160 |
| 2009/0055643 | A1 | 2/2009 | Brown et al. |
| 2009/0169013 | A1* | 7/2009 | Fascenda et al. ............ 380/277 |
| 2009/0185677 | A1 | 7/2009 | Bugbee |
| 2009/0228707 | A1* | 9/2009 | Linsky ........................ 713/171 |
| 2009/0265552 | A1 | 10/2009 | Moshir et al. |
| 2009/0268902 | A1* | 10/2009 | Fascenda et al. ............ 380/44 |
| 2010/0020972 | A1 | 1/2010 | Baugher et al. |
| 2010/0159962 | A1 | 6/2010 | Cai et al. |
| 2011/0138170 | A1* | 6/2011 | Fascenda et al. ............ 713/150 |
| 2011/0138172 | A1* | 6/2011 | McCreight et al. .......... 713/155 |
| 2011/0194695 | A1* | 8/2011 | Fascenda et al. ............ 380/255 |
| 2012/0054493 | A1* | 3/2012 | Bradley ....................... 713/171 |
| 2012/0239417 | A1 | 9/2012 | Pourfallah et al. |
| 2012/0239560 | A1 | 9/2012 | Pourfallah et al. |
| 2013/0030828 | A1 | 1/2013 | Pourfallah et al. |

OTHER PUBLICATIONS

Aug. 16, 2012 & Oct. 4, 2013 Office Actions in U.S. Appl. No. 12/940,213.

Aug. 1, 2013 & Mar. 7, 2014 Office Actions in U.S. Appl. No. 13/328,706.

Feb. 25, 2014 Office Action in U.S. Appl. No. 13/671,054.

* cited by examiner

Example User Interfaces
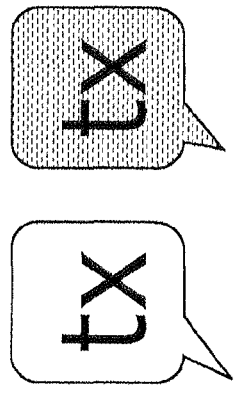
Standard   Secure
FIG.6A
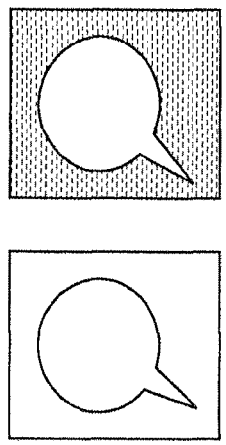
Standard   Secure
FIG.6B
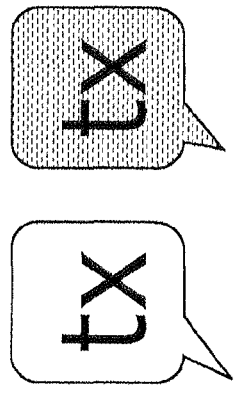
Standard   Secure
FIG.6C
Compose SMS   Compose Secure Txt
FIG.6D

Example Data Structures

| Contact Info | Value |
|---|---|
| Telephone number | xxxx |
| IP Address | xxxx |
| E-mail | xxxx |
| Unique | xxxx |
| Other | xxxx |

602(1)

| Contact Info | Value |
|---|---|
| Telephone number | xxxx |
| IP Address | xxxx |
| E-mail | xxxx |
| Unique | xxxx |
| Other | xxxx |

Example Data Structures
Key Ring - Disk/Memory/Secure Storage

| Key Ring Element | Value |
|---|---|
| Contact | xxxx |
| Public Key | xxxx |
| Key Continuity Value | xxxx |
| Other | xxxx |

| Key Ring Element | Value |
|---|---|
| Contact | xxxx |
| Public Key | xxxx |
| Key Continuity Value | xxxx |
| Other | xxxx |

FIG. 8B

Contact Registration Exchange (CRE) + OTP

1100 —— Bob and Alice agree on an OTP out of band of the CRE exchange

Bob enters in OTP to ProtectedSMS to use for exchange of cryptographic material with Alice's device —— 1110

Alice enters in OTP to ProtectedSMS to use for the exchange of cryptographic material with Bob's device

—— 1120

Bob's Devices communicates his public key to Alice's device via some exchange method using OTP to authenticate/encrypt message —— 1130

—— 1140 —— Alice's device receives registration request message. Asks Alice if she wants to record Bob's public key – Alice says yes. OTP used to validate/decipher message. If success Bob's Public Key is added to Alice's Key ring

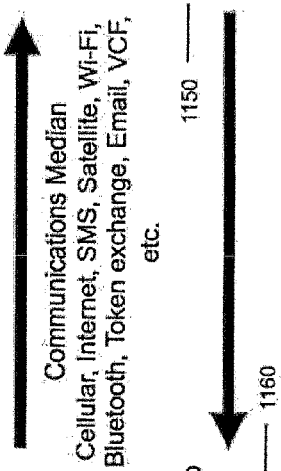

Communications Median
Cellular, Internet, SMS, Satellite, Wi-Fi, Bluetooth, Token exchange, Email, VCF, etc.

—— 1150 —— Alice's device communicates her public key with Bob's via an appropriate exchange method using OTP to authenticate/encrypt message Bob's device receives registration response. ProtectedSMS uses OTP to validate Alice's messages. If success, accepts Alice's public key, places it on his key ring —— 1160

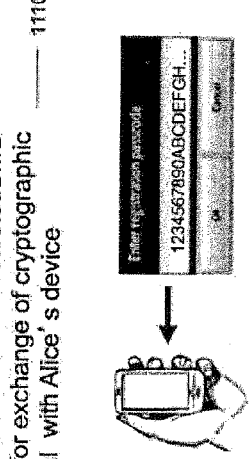

FIG. 11

SYSTEMS AND METHODS USING ONE TIME PADS DURING THE EXCHANGE OF CRYPTOGRAPHIC MATERIAL

CROSS-REFERENCES TO RELATED APPLICATIONS

This patent application claims priority from and is a Continuation in Part of U.S. patent application Ser. No. 12/940,213 filed Nov. 5, 2010, which in turn claims priority from provisional application No. 61/351,979 filed Jun. 7, 2010. The entirety of each of these patent applications is incorporated herein by reference in its entirety.

This application is also related to and claims the benefit of priority from the following provisional applications, the entirety of each of these patent applications is incorporated herein by reference:

- U.S. Provisional Patent Application No. 61/556,652 filed Nov. 7, 2011 entitled "Systems And Methods Using One Time Pads During The Exchange Of Cryptographic Material" and counterpart non-provisional application Ser. No. 13/670,994 filed Nov. 7, 2012;
- U.S. Provisional Patent Application No. 61/556,635 filed Nov. 7, 2011 entitled "Secure Messaging" and counterpart non-provisional application Ser. No. 13/670,925 filed Nov. 7, 2012;
- U.S. Provisional Patent Application No. 61/556,734 filed Nov. 7, 2011 entitled "Systems And Methods Enabling A Short Message Service Gateway Via Cloud Computing Services" and U.S. Provisional Patent Application No. 61/562,314 filed Nov. 21, 2011 entitled "Systems And Methods Enabling A Short Message Service Gateway Via Cloud Computing Services" and counterpart non-provisional application Ser. No. 13/671,054 filed Nov. 7, 2012; and
- U.S. Provisional Patent Application No. 61/557,598 filed Nov. 9, 2011 entitled "Systems And Methods For Enabling Secure Messaging, Command, And Control Of Remote Devices, Communicated VIA A Short Message Service Or Other Message Oriented Communications Mediums" and counterpart non-provisional application Ser. No. 13/671,026 filed Nov. 7, 2012.

STATEMENT REGARDING FEDERALLY SPONSORED RESEARCH OR DEVELOPMENT

N/A

FIELD

The technology herein relates to exchange of cryptographic material, and more particularly to methods and systems used to secure the exchange of cryptographic material between cooperating peers.

BACKGROUND AND SUMMARY

One of the many problems with the exchange of cryptographic material is ensuring its authenticity. To date, many systems have been devised to enable two peer devices to exchange credentials in an authenticate fashion. This includes the use of X.509 certificates that are associated with a certificate authority. Other methods such as a Short Authentication String (SAS) have been devised by the Pretty Good Privacy (PGP) efforts. Such traditional methods have shortcomings whether it be in terms of complexity or fragility against malicious attacks.

For example, suppose that two peer systems wish to securely exchange message-oriented data across unsecure voice and/or data communications paths. Based on the use of public key cryptography, the at least two peers exchange public keys in an authenticated manner. Traditionally this is done using additional infrastructure and/or at least one trusted third party (e.g., a certifying authority) that can vouch for the veracity of each of the public keys to prevent spoofing. This additional infrastructure or service can be cumbersome to setup and use, and can also be expensive to maintain.

To alleviate this burden, the exchange of cryptographic material can be enhanced by using a one time passcode or passphrase (OTP) that is minimally used to validate the authentication of the cryptographic material between cooperating peers. The OTP may also be used as a seed to encipher the exchange, obscuring the cryptographic material from potential nefarious or malicious parties. Furthermore, the OTP can be end-user friendly, allowing input through standard user input methods (i.e. keyboard, touchscreen, gestures, etc.).

For increased privacy, it is desirable for the OTP to be agreed upon between the cooperating peers out of band of the cryptographic material exchange. In one exemplary non-limiting example, voice communications (either over a network or in person) may be used to securely exchange the one time pad. Using this a priori knowledge of the OTP, it is then applied to authenticating and/or deciphering the cryptographic material that can be used as the basis for subsequent communications.

Consider the following non-limiting use case where two individuals would like to exchange cryptographic material used to secure short message service (SMS) communications with an application such as ProtectedSMS. In one common example scenario, two individuals are standing near one another and exchange contact information such as name, phone number, etc. During their exchange, one party suggests an OTP to use for establishing a secure relationship. As indicated before, this can be in the form of numbers, letters, passwords, gestures on a touch screen, etc. At this point the users enter the OTP into the application for use during the Protected SMS Contact Registration Exchange (CRE). Prior to the initiating peer sending out the registration request, the OTP is used as an authentication key for a one-way keyed-hash algorithm such as SHA256-HMAC and/or used as or to generate a cryptographic key that can be used to encipher the message. Upon the processing of the registration request message by the receiving peer, the Protected SMS application will use the OTP to decipher and/or authenticate the registration request. If the process correctly deciphers and/or authenticates the request, the peer knows that the request was valid from the initiating party. If not, an error status is returned to the user to indicate that either the request may have been corrupted in transit or a nefarious party tried to mount was is commonly referred to as a man-in-the-middle (MITM) attack. If the message was valid, the OTP can then be used to authenticate and/or cipher the registration response message that is sent back to the initiating peer. At this point, if the registration exchange has successfully completed, each peer system can be confident in the veracity of the cryptographic material exchanged.

Integrating the OTP functionality into the initial exchange of cryptographic material between two systems further increases the security of the exchange. If the OTP is truly random and kept secret between the two parties exchanging the cryptographic material, the validity of the material can be assured. As a by-product of this process, attempts to thwart the exchange can also be more easily detected.

BRIEF DESCRIPTION OF THE DRAWINGS

These and other features and advantages will be better and more completely understood by referring to the following detailed description of exemplary non-limiting illustrative embodiments in conjunction with the drawings of which:

FIGS. 6A-6D show exemplary illustrative non-limiting user interface selection arrangements;

FIGS. 8A, 8B show example non-limiting data structures;

FIG. 11 depicts a non-limiting example of how an OTP can be applied to the exemplary ProtectedSMS Contact Registration Exchange process.

DETAILED DESCRIPTION

One-Time Pad Used for the Exchange of Cryptographic Material

As described in parent U.S. patent application Ser. No. 12/940,213 (incorporated herein by reference), the ProtectedSMS application instantiates a secure relationship between cooperating peers with the exchange of asymmetric cryptographic public keys. This public key exchange is then used as the basis to derive key material used for symmetric encryption operations for subsequent secure message oriented communications.

The "Detailed Description" of FIGS. 1, 1A, 2, 3, 4A, 4B, 5, 5A-5B, 6A-6D, 7, 8A, 8B and 9 of above-referenced U.S. patent application Ser. No. 12/940,213 is incorporated herein by reference as if expressly set forth.

Figure 1:
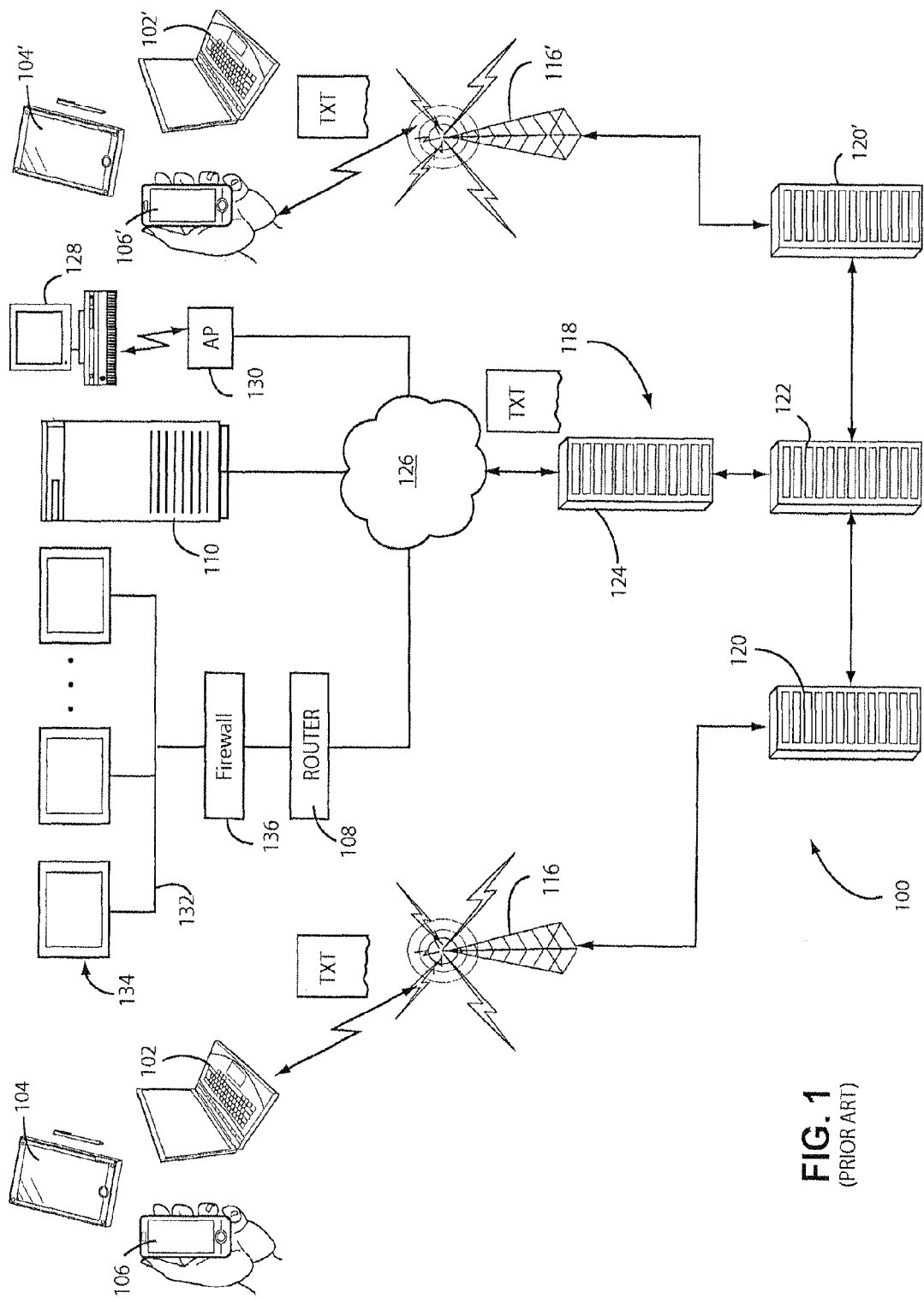
FIG. 1 schematically illustrates an exemplary illustrative non-limiting prior art conventional text or other messaging communication system.
Figure 1A:
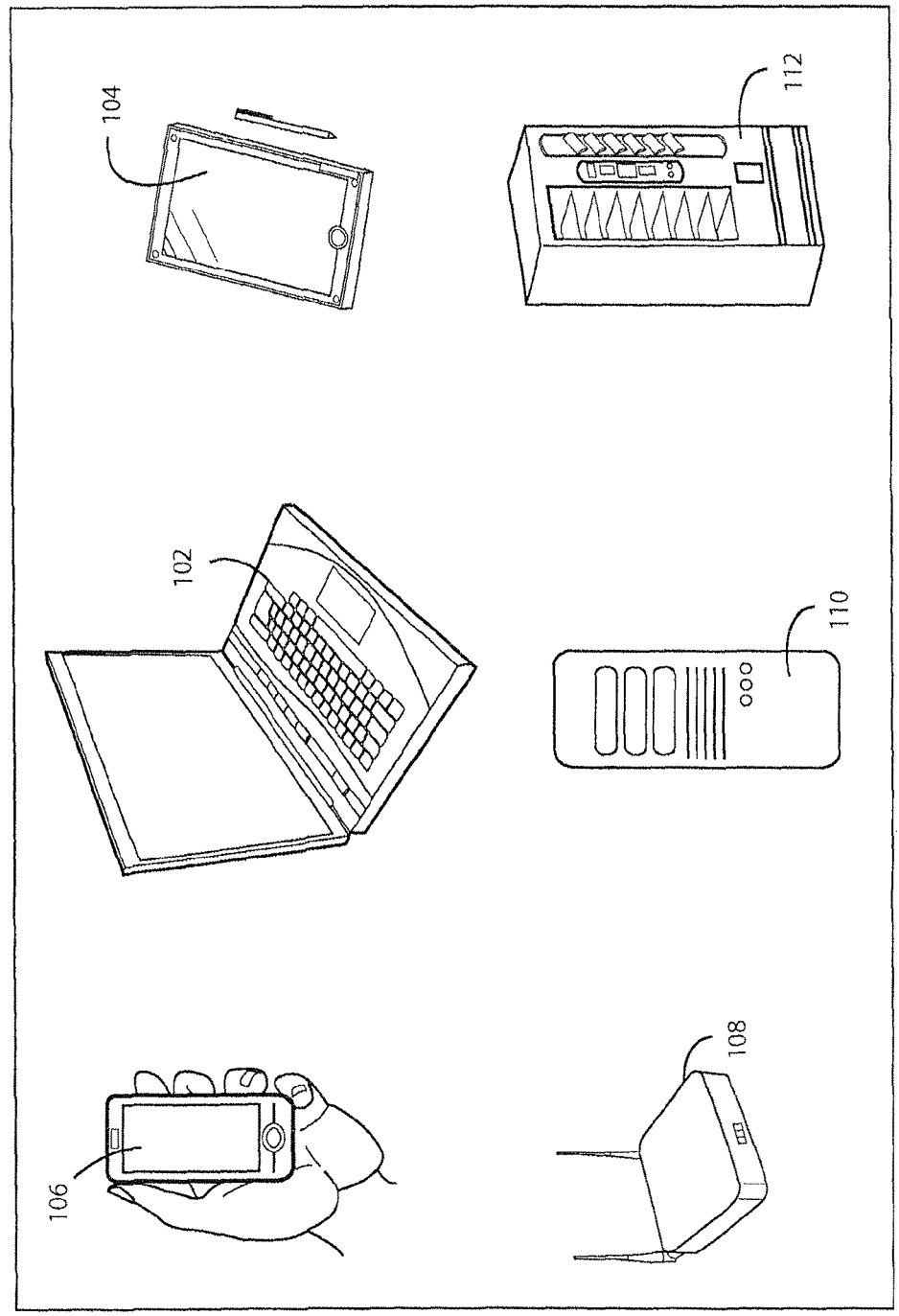
FIG. 1A shows non-exhaustive examples of end user or other devices that can be employed.
Figure 2:
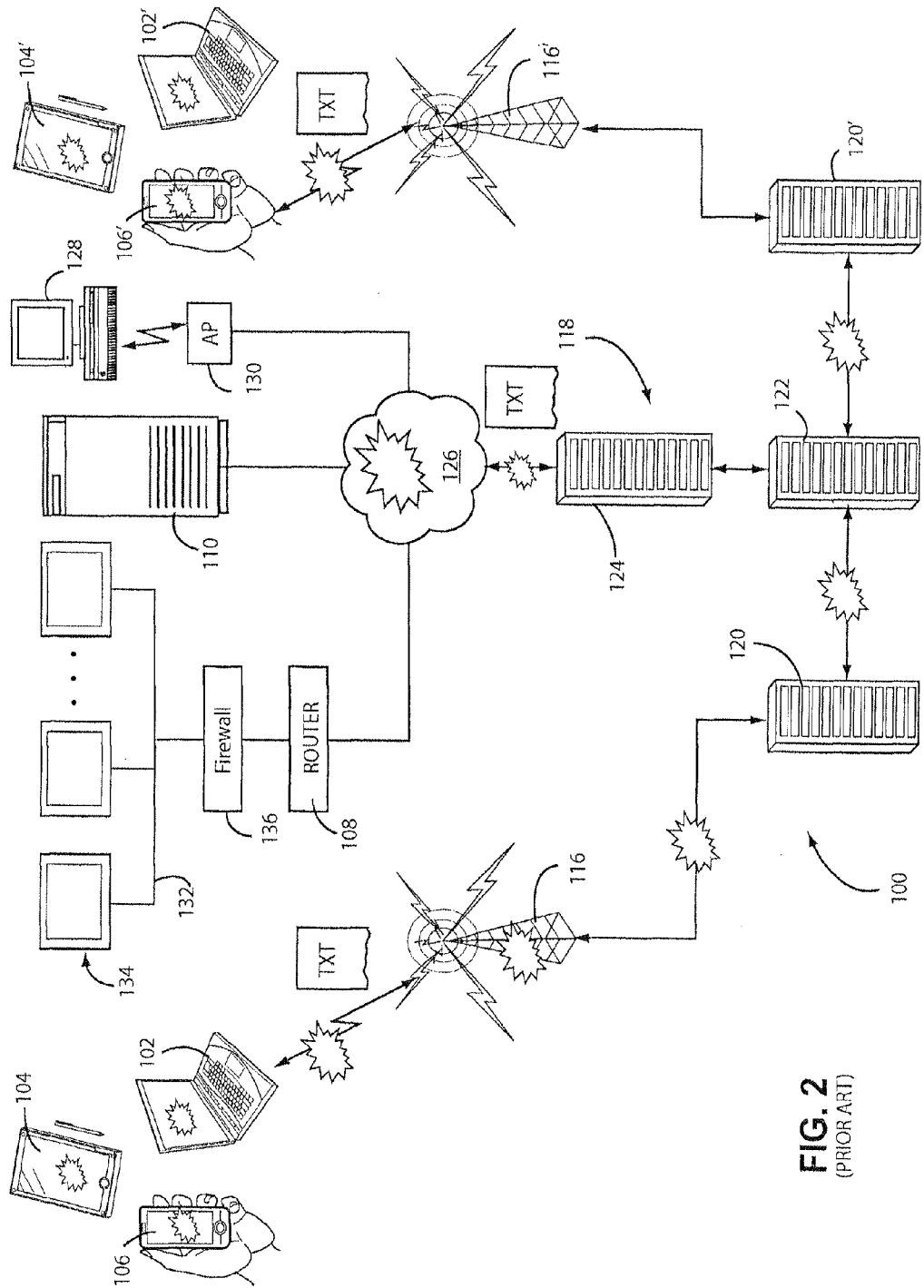
FIG. 2 shows multiple vulnerabilities present in the FIG. 1 prior art system.
Figure 3:
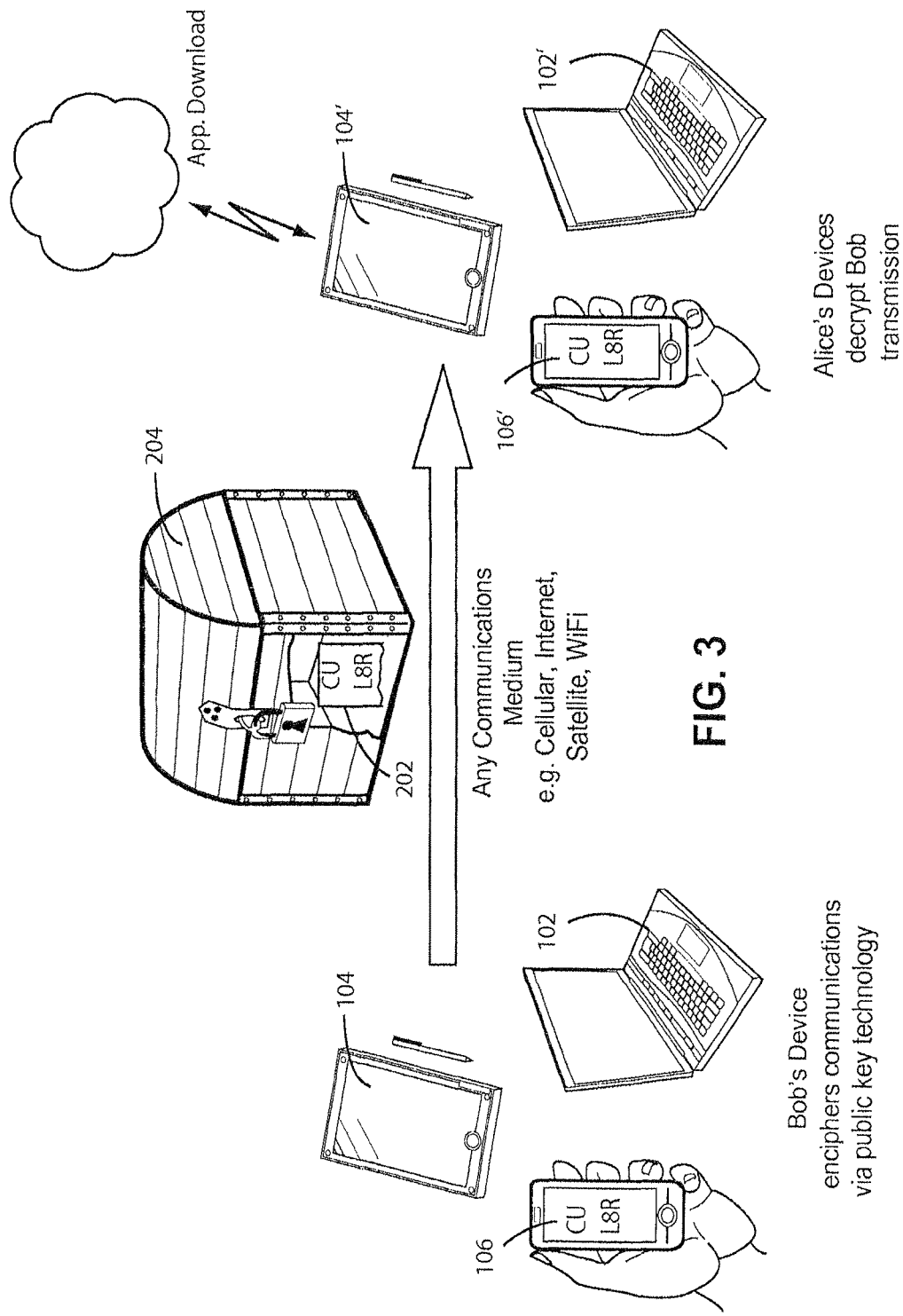
FIG. 3 shows one way that end-to-end security can be provided irrespective of the communications medium and without requiring any intermediary device for secure transmissions.
Figure 4A:
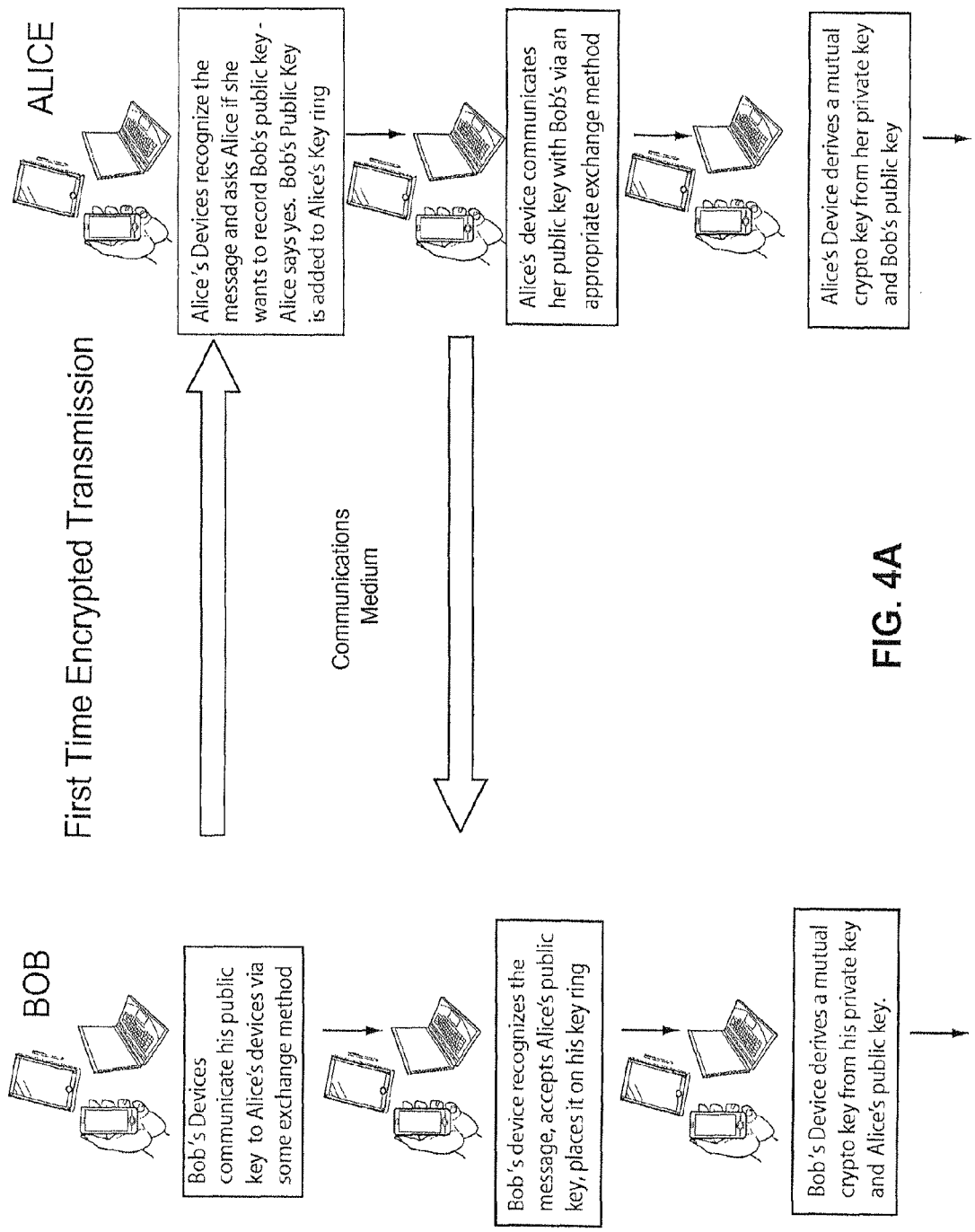
FIGS. 4A, 4B show an exemplary illustrative non-limiting protocol and flow arrangement for establishing secure communications between two end-user devices.
Figure 4B:
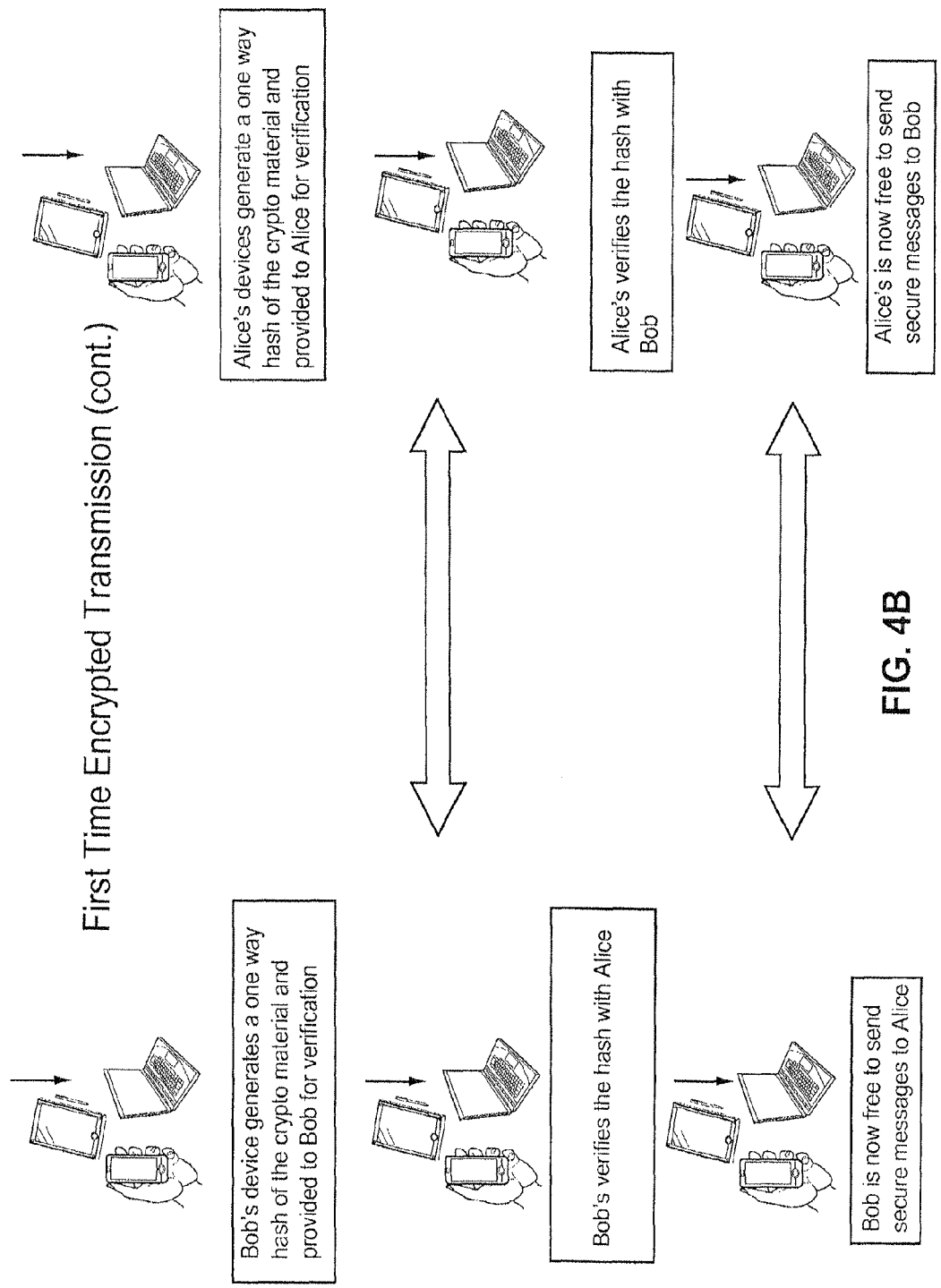
Figure 5:
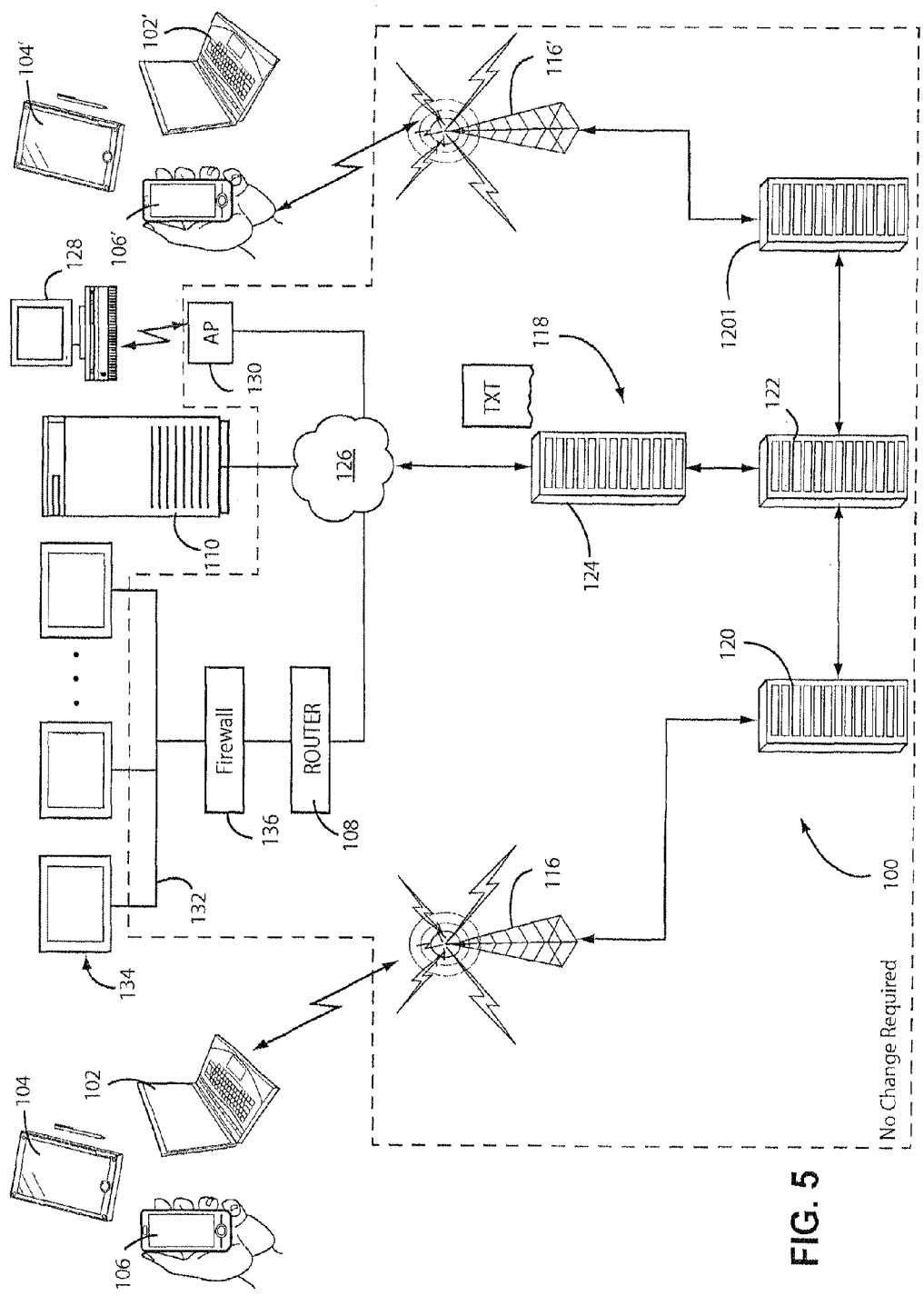
FIG. 5 shows how the FIGS. 4A, 4B arrangement does not impact or require any changes to the communication infrastructure while nevertheless providing end-to-end security.
Figure 5A:
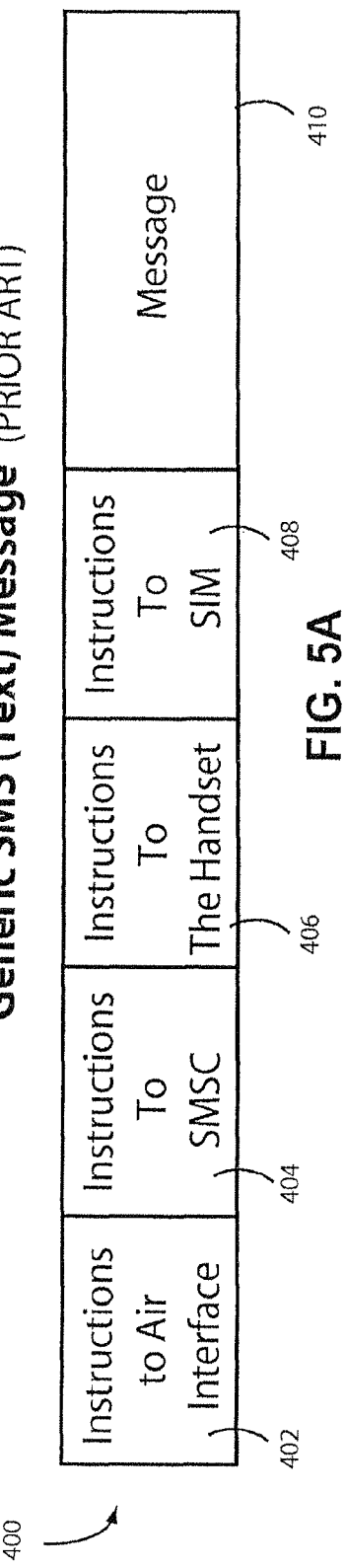
FIGS. 5A-5B show example message transmission protocols.
Figure 5B:
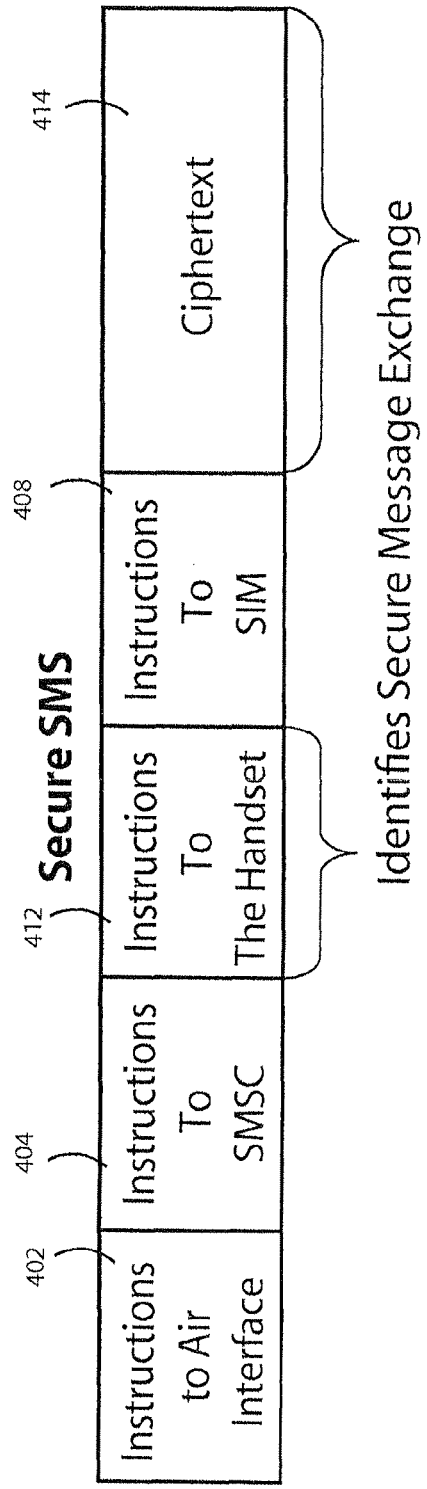
Figure 7:
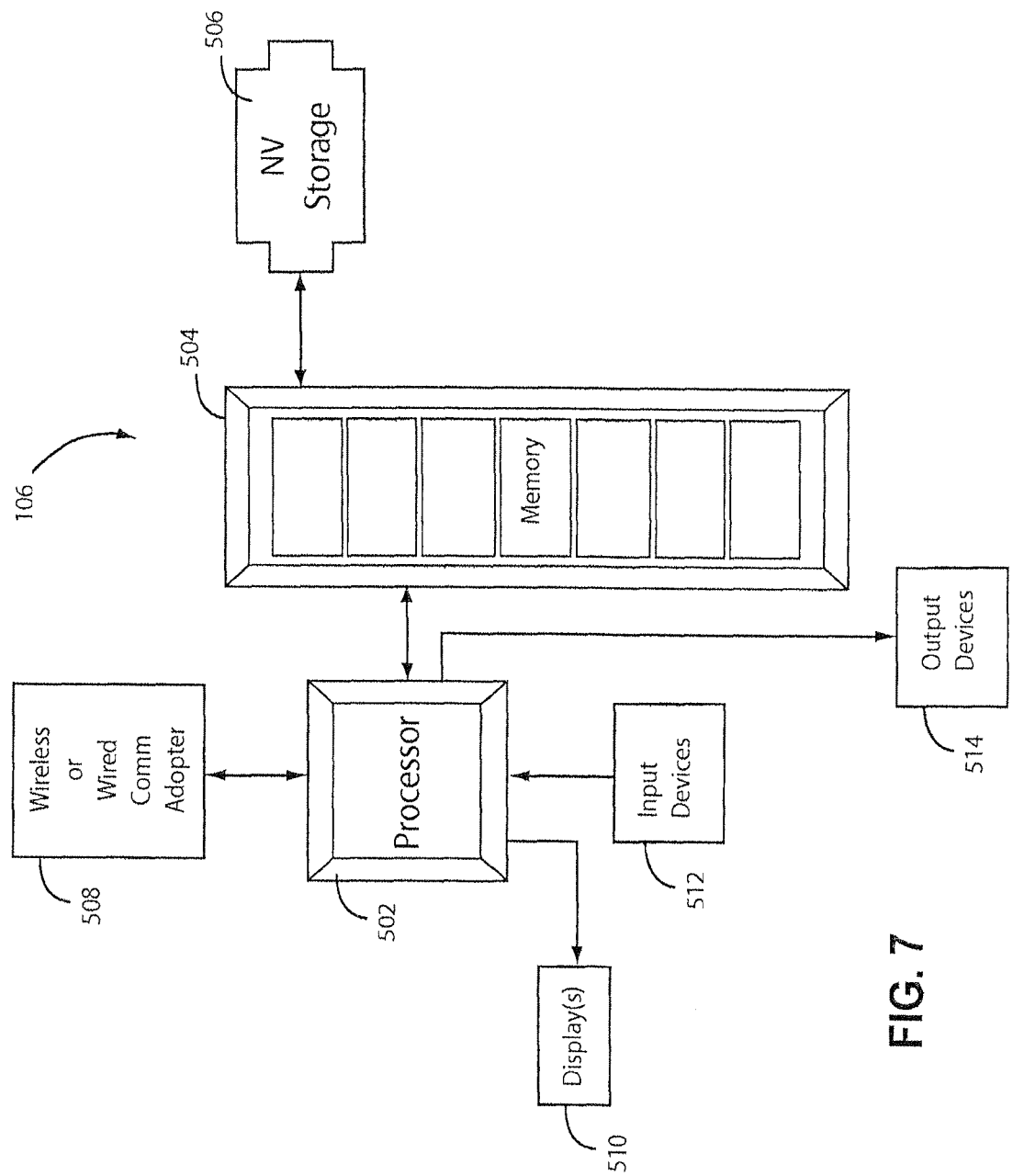
FIG. 7 shows an exemplary illustrative non-limiting end-user device architecture.
Figure 9:
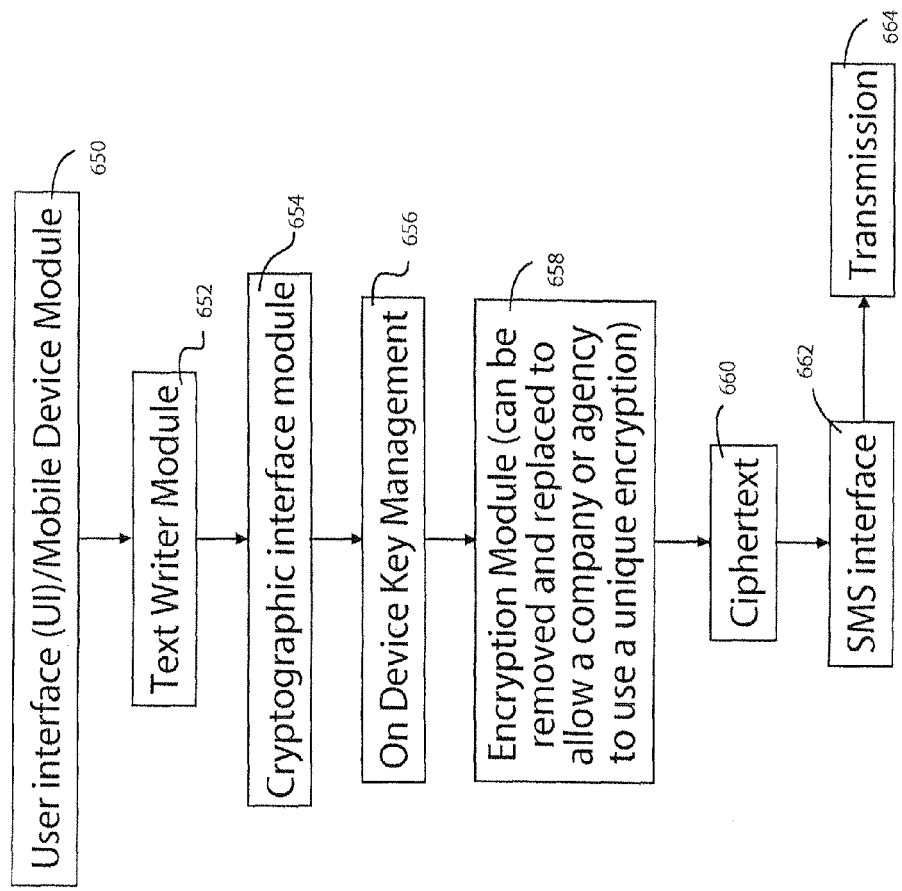
FIG. 9 shows an exemplary illustrative non-limiting flowchart of program control steps.
Figure 10:
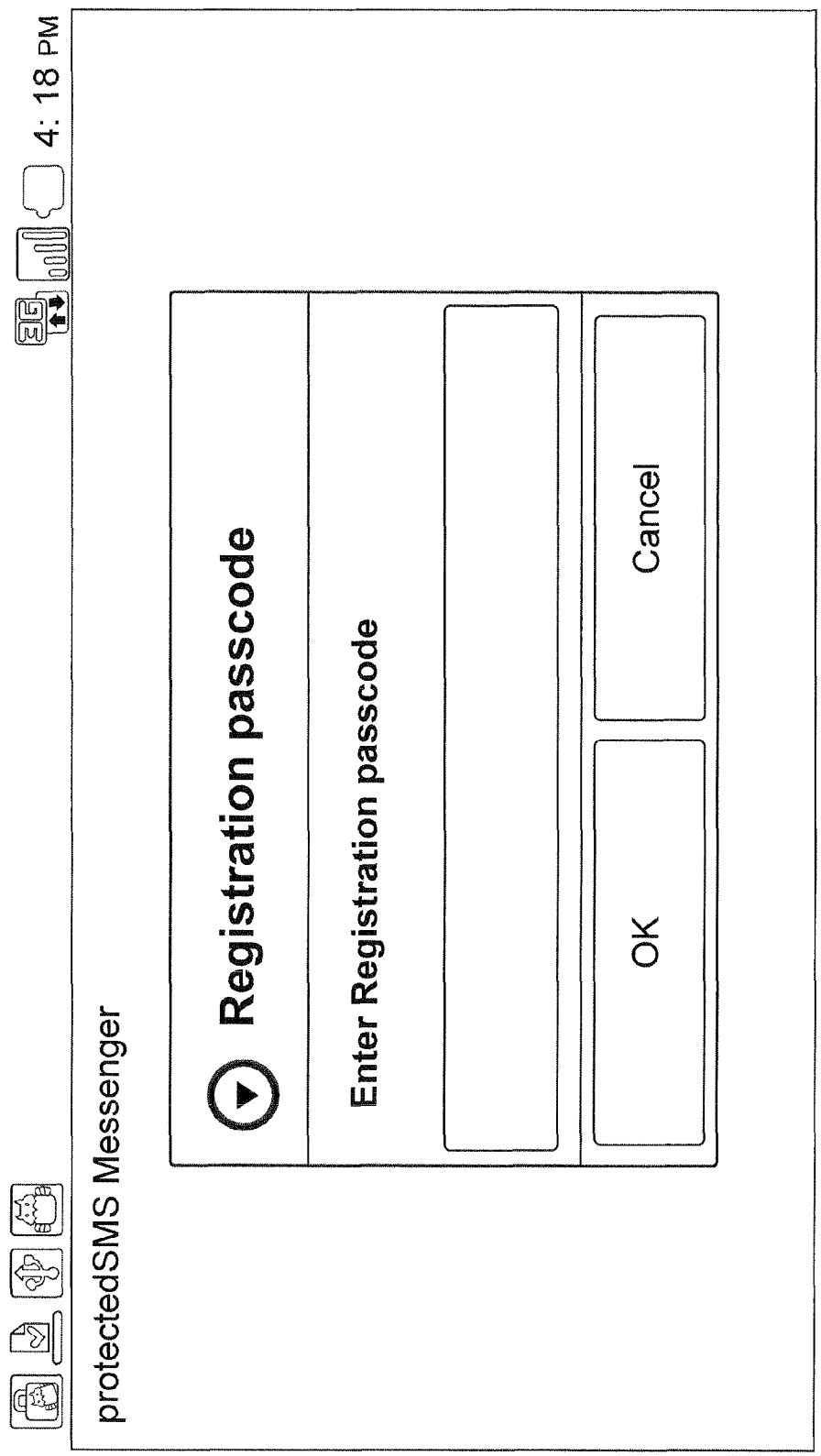
FIG. 10 is an illustrative non-limiting example of one way an OTP can be entered into an application such ProtectedSMS.

Looking at FIG. 10, during the registration message processing, the user interface component of the ProtectedSMS application may prompt for the OTP to be entered so the application can incorporate its use during the processing of the registration requests.

This process is further illustrated in FIG. 11. At step 1100, the at least two cooperating parties (Bob and Alice) determine and agree upon the OTP to use for their exchange. In one illustrative embodiment, Bob enters in the OTP via standard input methods to the ProtectedSMS application. Alice does the same at step 1120. The ProtectedSMS application may validate the OTP input to ensure it's within given policy guidelines that may be set for the application (i.e. length, upper/lower case letters, punctuation, etc.). Alternative methods of input can be easily envision by those schooled in the art. For example if a gesture is used as input on a touch screen, the application may asked the user to repeat the pattern. If a stylist is used, touching the screen at different coordinates may be used as the input for the OTP. Biometrics may also be used, where one party uses for example their thumbprint on both devices. In the scenario described above where both parties are in the same proximity, Bob and/or Alice may touch both devices as input.

Once the OTP is provided as input to the application, at step 1130 Bob's device prepares to initiate the Contact Registration Exchange. ProtectedSMS now applies the OTP to the authentication/encryption process prior to sending the registration request message. Along with his public key, ancillary information such as name, phone number, address, etc., may also be included as part of this message. Once the message is hashed and/or cipher using the OTP as part of the cryptographic process, Bob's device forwards the message over a potentially unsecure communications medium (SMS, Internet, Bluetooth, WiFi, flash memory card, etc.).

At step 1140, Alice's device receives the CRE registration request. Again, using the OTP, the ProtectedSMS application applies the OTP during its ciphering/authentication process for the message. If the message is successfully deciphered and/or authenticated, Alice is then able to accept Bob's public key and any ancillary information with the additional level of assurance that Bob originated the message.

At step 1150, after acceptance of Bob's information, Alice's device reverses the process and uses the OTP during its ciphering, authentication, and preparation of the registration response message. Alice's device then communicated the message over a potentially unsecure channel or medium (SMS, Internet, Bluetooth, WiFi, flash memory card, etc.). At step 1160, Bob's device receives the registration response message and uses the OTP in its deciphering/authentication process. If the process is successful, the ProtectedSMS application notifies Bob that the exchange has been completed and records Alice's public key along with any ancillary information for subsequent use.

In a similar manor as the ProtectedSMS application, the Protected Mobility Enterprise Console (PMEC) may also use an OTP when registering with devices that it manages/communicates with.

Figure 12:
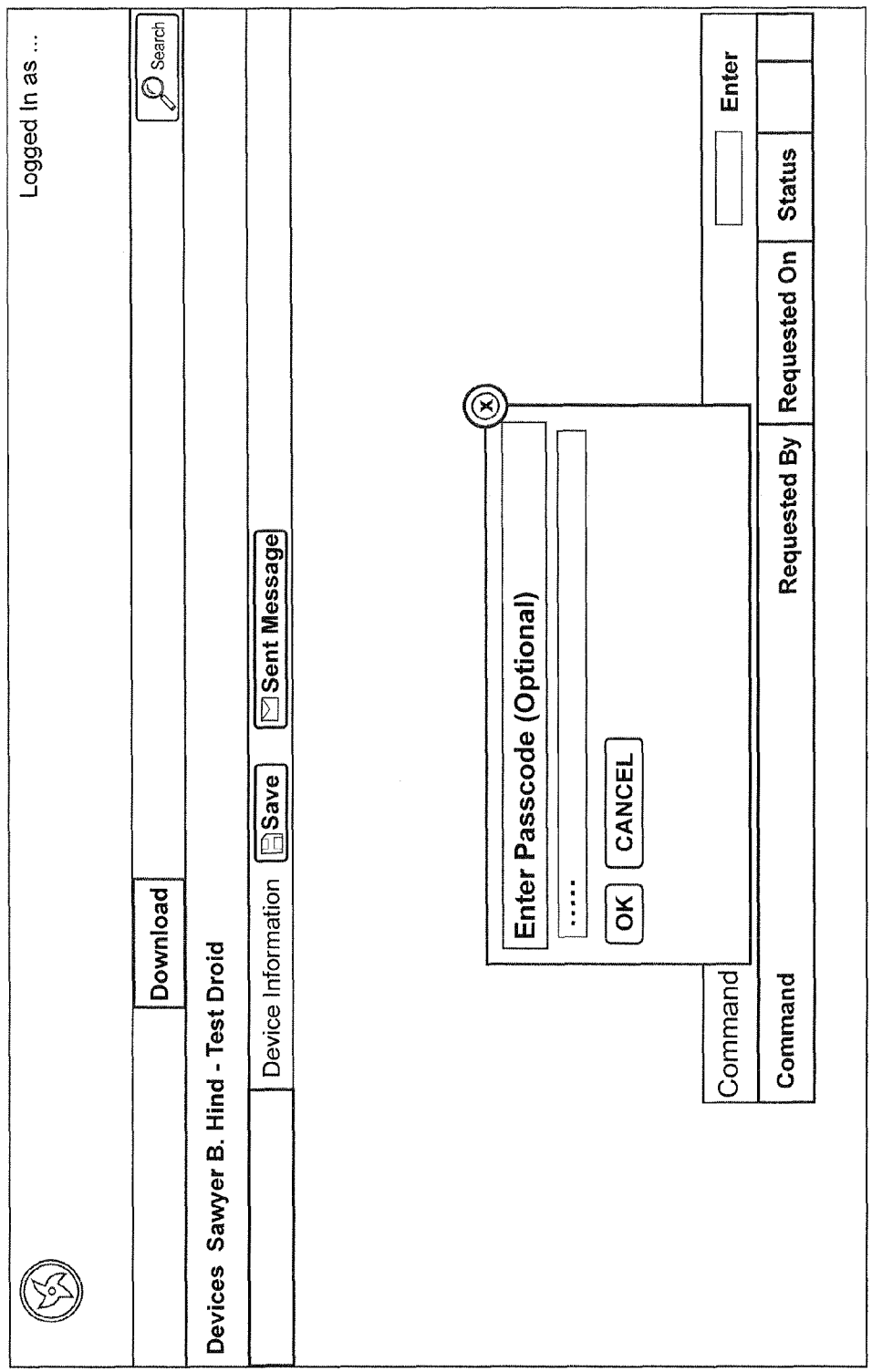
FIG. 12 is second non-limiting example of inputting an OTP for use with the ProtectedSMS Contact Registration Exchange process.

FIG. 12 is an example of how via a Web UI the OTP can be entered. When an operator of the PMEC system want to register a device that it will manage/securely communicate with, the PMEC application may prompt the user to enter an OTP. Alternatively, an OTP may be randomly generated for the operator using a (pseudo) random source of information such as a DRBG and convert its output into human readable form (letters, numbers, punctuation, etc.) The OTP may be communicated with the peer device through an out of band communications, such as secure enterprise email service, voice communications, etc. Alternatively, the device may actually be near the operator, where he or she may complete the registration process by entering in the OTP to the application. From that point on, the process continues in a similar fashion as to the one discussed above. Alternative methods of input and exchange of an OTP can be easily envisioned by those skilled in the art.

While the technology herein has been described in connection with exemplary illustrative non-limiting embodiments, the invention is not to be limited by the disclosure. The invention is intended to be defined by the claims and to cover all corresponding and equivalent arrangements whether or not specifically disclosed herein.

We claim:

1. A method of establishing and conducting secure short message communications between plural peer devices, comprising:
   (a) transmitting cryptographic information to a peer device over an electronic connection;
   (b) securely providing, to each of the plural peer devices, a one time pad using a communication that is out of band with respect to the electronic connection including not conveying the one time pad over the electronic connection but instead using a different communications path that prevents interception of the one time pad by eavesdroppers on the electronic connection, the one time pad comprising a one time passcode or passphrase for input into each of the plural peer devices;
   (c) using the one time pad to authenticate the transmitted cryptographic information and/or as a seed to cipher the cryptographic information for transmission;
   (d) generating a shared secret from the cryptographic information; and
   (e) using the shared secret to securely protect short messages for exchange between the plural peer devices over the same or different electronic connection.

2. The method of claim 1 wherein the short messages comprise SMS messages.

* * * * *